United States Patent [19]
Kuo

[11] Patent Number: 5,145,043
[45] Date of Patent: Sep. 8, 1992

[54] HYDRAULIC CLUTCH

[76] Inventor: J. F. Kuo, 5F, No.188, Sec.3, Hsin-Yi Road, Taipai, Taiwan

[21] Appl. No.: 599,523

[22] Filed: Oct. 18, 1990

[51] Int. Cl.⁵ .............................................. F16D 31/04
[52] U.S. Cl. ....................................... 192/61; 192/83; 192/103 FA; 475/95
[58] Field of Search .............. 192/61, 103 F, 103 FA, 192/105 F, 83, 103 R; 475/94, 95

[56] References Cited

U.S. PATENT DOCUMENTS

| | | | |
|---|---|---|---|
| 873,621 | 12/1907 | Schwarz | 192/61 |
| 1,107,944 | 8/1914 | Herpolsheimer | 192/61 |
| 1,132,746 | 3/1915 | Sund | 192/61 |
| 1,688,852 | 10/1928 | Christie | 192/61 |
| 1,918,236 | 7/1933 | Baker | 192/61 |
| 1,993,988 | 3/1935 | Barrett | 475/95 |
| 2,552,010 | 5/1951 | Marsell | 192/61 X |
| 2,704,141 | 3/1955 | Doshier | 192/61 |
| 2,730,218 | 1/1956 | Wickman | 192/61 |
| 3,051,283 | 8/1962 | Bentley | 192/61 |
| 3,300,005 | 1/1967 | Good | 192/61 |
| 4,248,332 | 2/1981 | Noyes | 192/61 |
| 4,344,338 | 8/1982 | Hattori et al. | 192/61 |

Primary Examiner—Richard Lorence
Attorney, Agent, or Firm—Sughrue, Mion, Zinn, Macpeak & Seas

[57] ABSTRACT

Disclosed is a hydraulic clutch mounted between a power source and an output shaft. The clutch includes a pump mechanism including a hollow housing assembly coupled to the power source and rotatably mounted on the output shaft and having hydraulic passages provided therein, a passive gear fixed to the output shaft, and at least one driving gear rotatably supported within the housing assembly and engaging for driving the passive gear; a valve member sleeved on the output shaft; a passage system provided among the output shaft, the pump mechanism and the valve member, and adapted to be flooded with a liquid coming from a liquid source; and a control mechanism adapted to optionally control the hydraulic clutch either to become a dynamically connected state wherein the output shaft is dynamically connected to the power source by interrupting the passage system to establish a sufficiently high hydraulic pressure within the housing assembly and around the driving and passive gears, or to become a dynamically disconnected state wherein the output shaft is disconnected from the power source by opening the passage system to release the established hydraulic pressure within the housing assembly.

4 Claims, 8 Drawing Sheets

HYDRAULIC CLUTCH

BACKGROUND OF THE INVENTION

The present invention relates to a clutch, and more particularly to an improved hydraulic clutch.

In a most common conventional clutch, which is usually referred to as a friction clutch, the power connection or disconnection between a power source and an output shaft is achieved by optionally engaging or disengaging a series of friction disks F and clutch plates C alternately arranged (see FIG. 1) between the power source and the output shaft. Such a friction clutch is disadvantageous in that the friction disks F usually wear out rather soon.

SUMMARY OF THE INVENTION

It is therefore an object of the present invention to provide a durable hydraulic clutch for power transmission between a power source and an output shaft which can be applied to a wide range.

According to the present invention, a hydraulic clutch comprises a pump mechanism including a hollow housing assembly coupled to the power source and rotatably mounted on the output shaft and having hydraulic passages provided therein, a passive gear fixed to the output shaft, and at least one driving gear rotatably supported within the housing assembly and engaging for driving the passive gear; a valve member sleeved on the output shaft; a passage system provided among the output shaft, the pump mechanism and the valve member, and adapted to be flooded with a liquid coming from a liquid source; and a control mechanism adapted to optionally control the hydraulic clutch either into a dynamically connected state wherein the output shaft is dynamically connected to the power source by interrupting the passage system to establish a sufficiently high hydraulic pressure within the housing assembly and around the driving and passive gears, or into a dynamically disconnected state wherein the output shaft is disconnected from the power source by opening the passage system to release the established hydraulic pressure within the housing assembly.

BRIEF DESCRIPTION OF THE DRAWING

The present invention may be better understood through the following description with reference to the accompanying drawings, in which.

DETAILED DESCRIPTION OF THE PREFERRED EMBODIMENT

Figure 1:
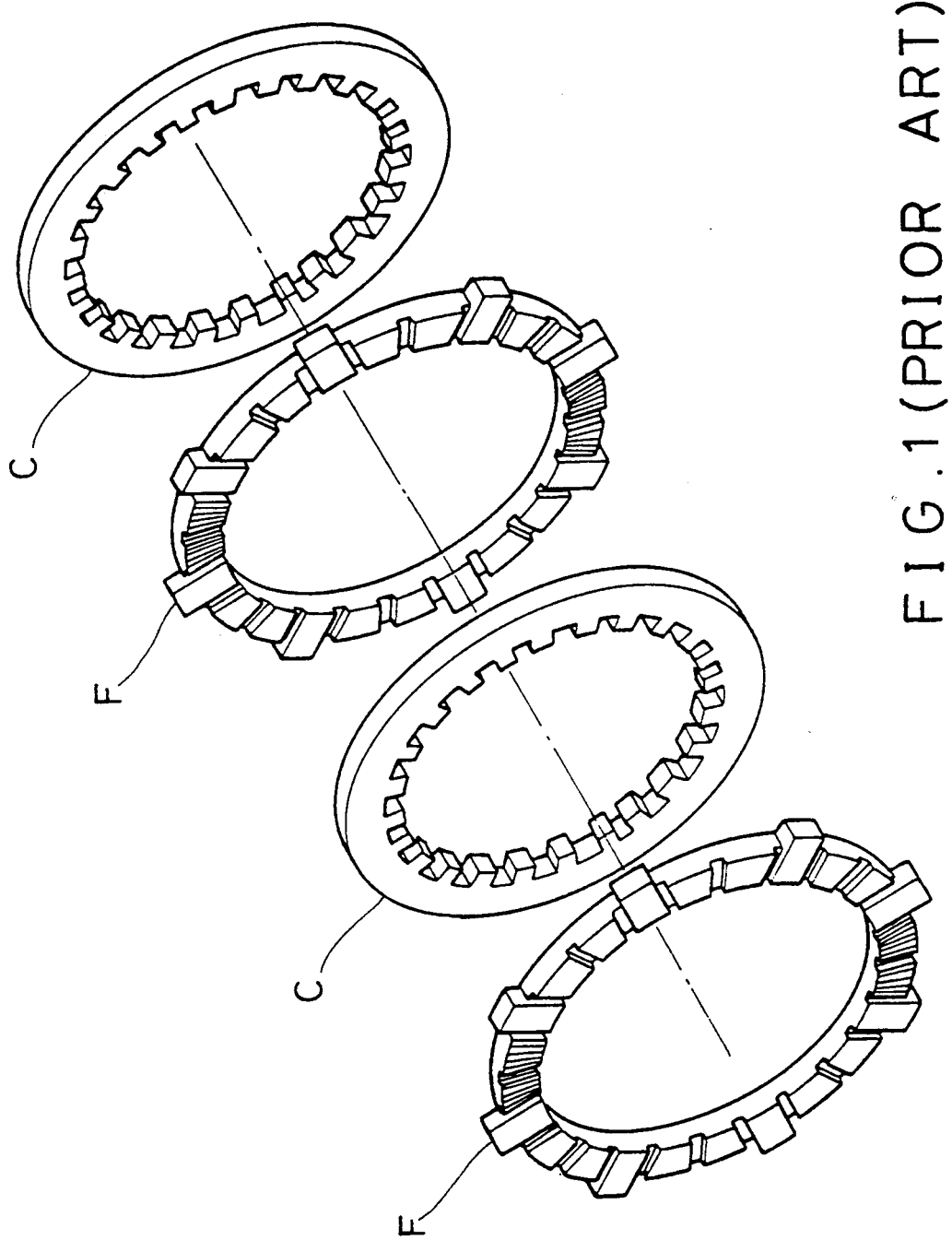
FIG. 1 is a schematically perspective view showing how a conventional friction clutch works.

Referring now to FIGS. 2-7, a first preferred embodiment of a hydraulic clutch according to the present invention is mounted between a power source (not shown) and an output shaft 1 having an axial oil passage 2 and a radial oil passage 3 communicating with passage 2 and includes a pump mechanism, a valve member 40, a passage means provided among the output shaft 1, the pump mechanism and the valve member 40 to be flooded with hydraulic oil, and a control mechanism capable of interrupting the passage means.

The pump mechanism includes a passive pumping gear 6 coaxially keyed to shaft 1 by a key 4, a pair of driving gears 5 driven by and diametrically oppositely positioned with respect to the passive pumping gear 6, and a housing assembly 9 for receiving gears 5 and 6. The housing assembly 9 includes a hub 10 dynamically coupled to the power source and rotatably mounted on shaft 1, a pump body 20 coaxially fixed to and cooperates with hub 10 to receive therebetween gears 5 and 6, and a pump casing 30 coaxially fixed to pump body 20 and having and outer annulus 33 and a hollow central portion 34 defining therebetween an annular space 35. A part of valve member 40 is received within annular space 35 and slidably sleeved about central portion 34, and the remaining portion of pump casing 30 is slidably sleeved about shaft 1.

The control mechanism comprises an automatic control device including at least one radially movable centrifugal ball 50 for actuating valve member 40 and a spring 51 for urging valve member 40 against ball 50, and a manual control device including a control rod 53 which can be operated to axially move valve member 40 along shaft 1 as desired, for example to return valve member 40 which has been translated by ball 50 back to its original position.

The passage means further includes an oil inlet 21 and an oil outlet 22 both provided in pump body 20, an oil outlet 31 and an oil inlet 32 both provided in pump casing 30 and respectively corresponding to inlet 21 and outlet 22 so that hydraulic oil can circulate between pump body 20 and pump casing 30, an annular oil passage 38 formed between central portion 34 and shaft 1, oil passage 41, 42 & 43 provided in valve member 40, and an oil passage 36 provided in central portion 34 for communicating passage 38 with passage 43.

Figure 6:
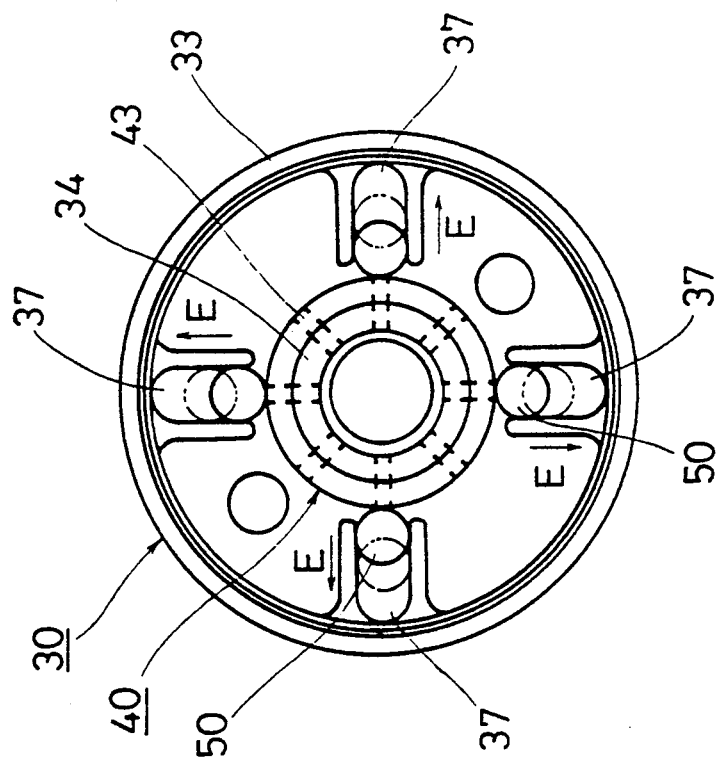
FIG. 6 is a sectional view taken along line 6A in FIG. 2.

As can be seen from FIG. 6, pump casing 30 further includes at least one radially extending groove 37 each of which receives therein a ball 50. Valve member 40 includes at least one radially outwardly extending inclined surface 44 engaging with ball 50, and a receiving groove 45 cooperating with a stopper 52 fixed to outer annulus 33 for mounting therebetween a spring 51 always urging valve member 40 against ball 50 via inclined surface 44.

Figure 2:
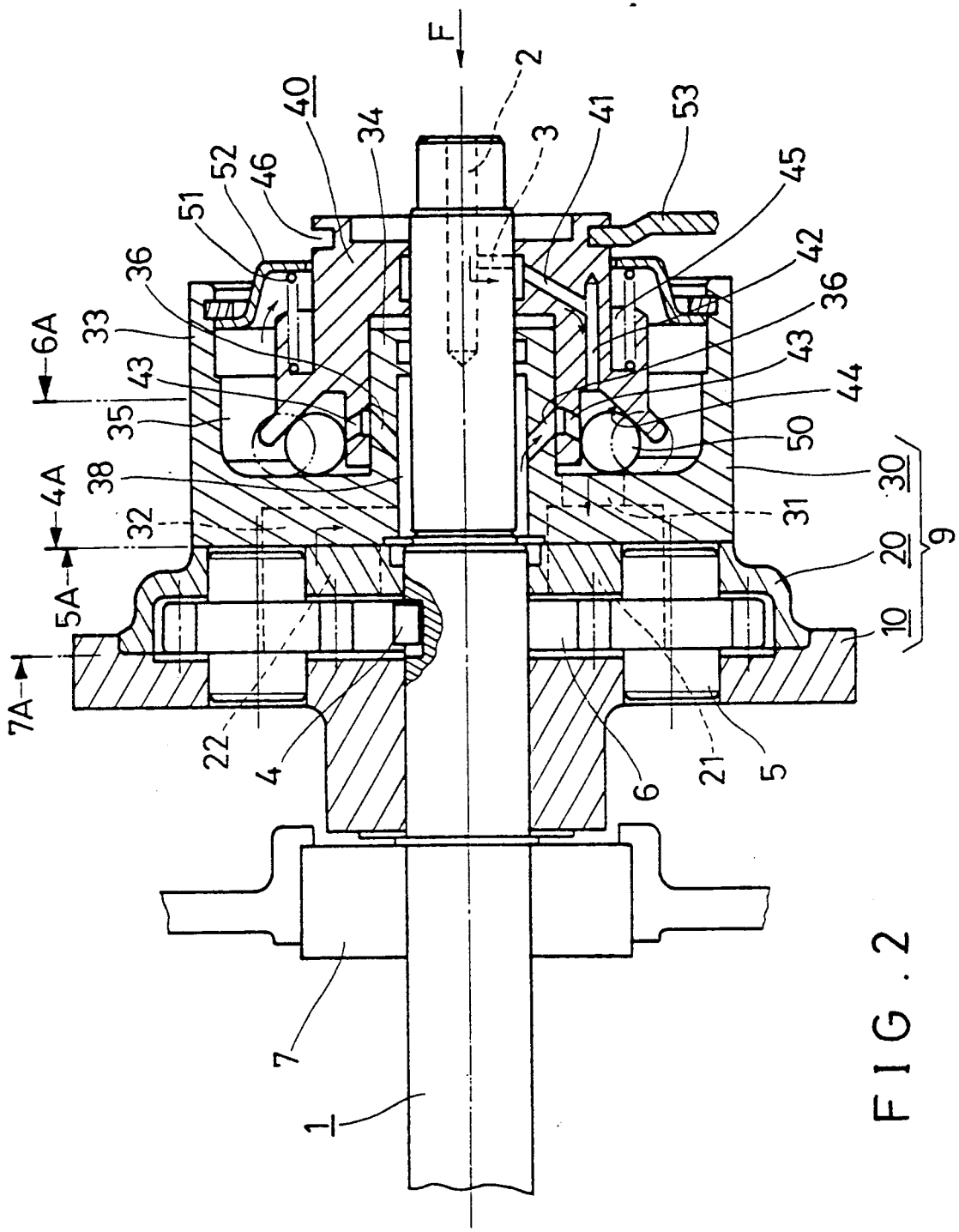
FIG. 2 is a sectional view showing a first preferred embodiment of a hydraulic clutch according to the present invention in a state wherein power transmission between the power source and the output shaft is disconnected.

In a dynamically disconnected state as shown in FIG. 2, passages 41 and 43 respectively align with passages 3 and 36 so that hydraulic oil coming from an oil source (not shown) can sequentially flow in the direction as shown by arrow F through passage 2, passage 3, passage 41; passage 42, annular space 35 and outlet 31 into housing assembly 9 and pumping gears 5 and 6 and is then further pumped through outlet 22, inlet 32, passage 38, passage 36, passage 43 and annular space 35 to constitute an oil circulating line. Since pumping gears 5 and 6 are in a relative rotation, hub 10 which is dynamically coupled to the power source does not carry shaft 1 to rotate therewith so that output shaft 1 and power source are dynamically diconnected.

Figure 3:
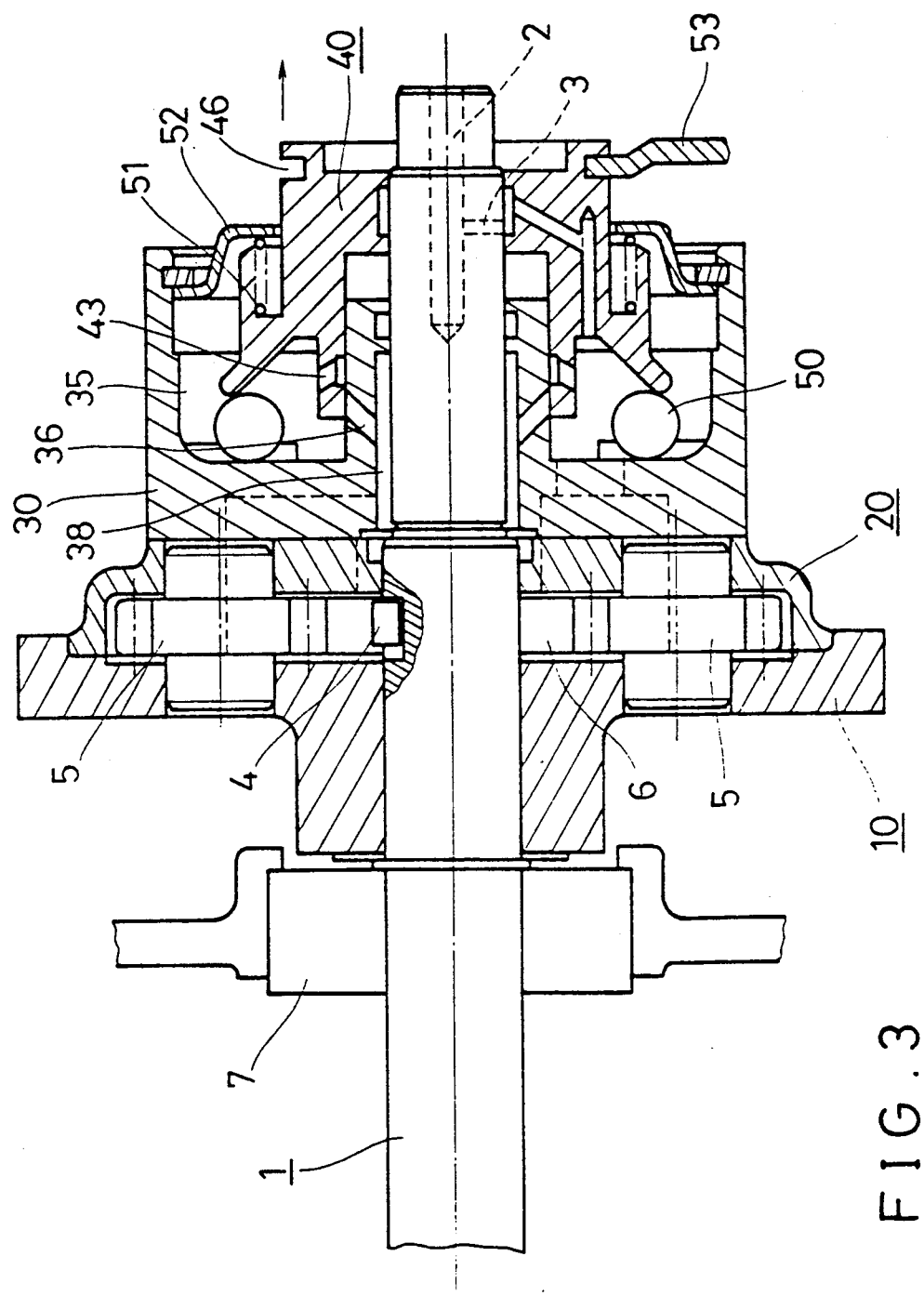
FIG. 3 is a sectional view similar to FIG. 2 except that the hydraulic clutch is in a state wherein power transmission between the power source and the output shaft is connected.
Figure 5:
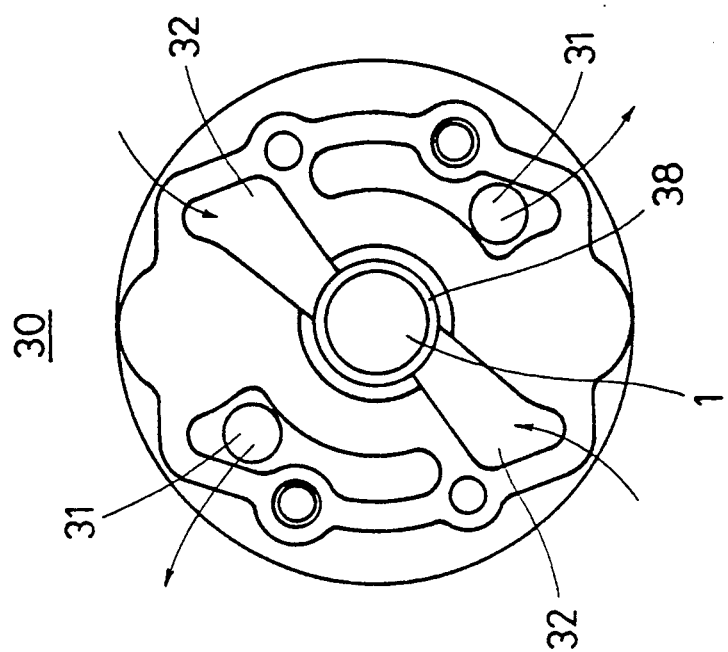
FIG. 5 is a sectional view taken along line 5A in FIG. 2.
Figure 4:
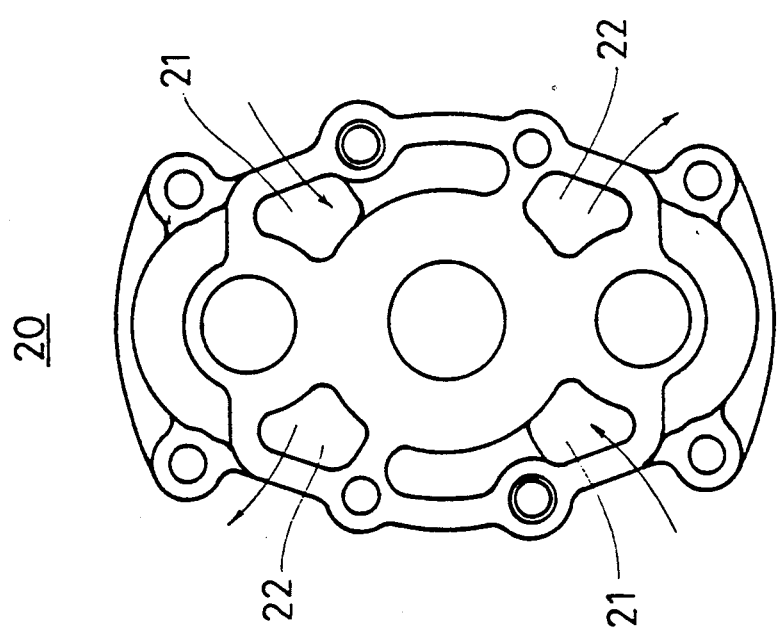
FIG. 4 is a sectional view taken along line 4A in FIG. 2.
Figure 7:
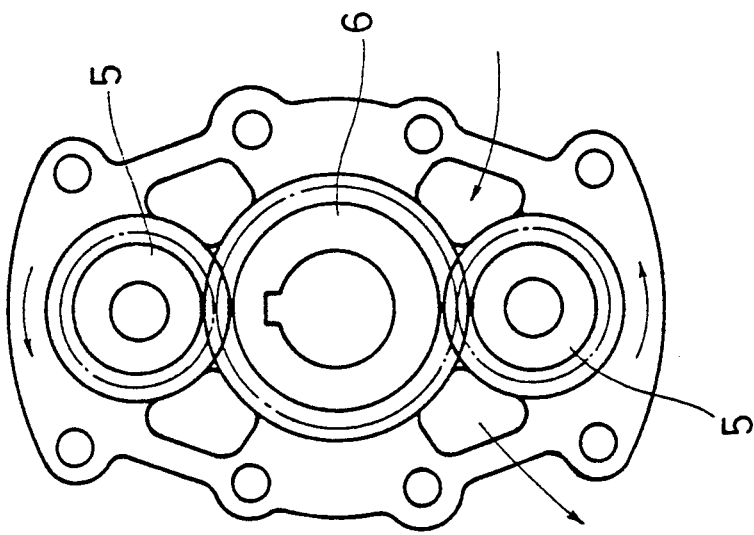
FIG. 7 is a sectional view taken along line 7A in FIG. 2.

When the rotation speed of housing assembly 9 gradually increases, each of the balls 50 carried by pump casing 30 within groove 37 (FIG. 6) is acted by a centrifugal force sufficient for overcoming the bonding force of ball 50 exerted by the inclined surface 44 of valve member due to biasing force of spring 51, and begins to move radially outward in the direction shown by arrow E along groove 37. Meanwhile, valve member 40 is moved by the outward moving balls 50 from a dynamically disconnected state as shown in FIG. 2 to a state as shown in FIG. 3, in which passages 36 and 43 no more communicate with each other so that passage means for hydraulic oil comprising passages 36 and 43 is interrupted. Under such situation, the hydraulic pressure of hydraulic oil flooded in passage 38 and between pumping gears 5 and 6 begins to increase. Finally a sufficient high hydraulic pressure is established, which prohibits any relative rotation between the pumping gears 5 and 6 so that hub 10, body 20 casing 30, gears 5, gear 6 and shaft 1 will be rotated as a whole without any relative rotation thereamong, thus forming a dynamically connected state between output shaft 1 and hub 10 which is coupled to the power source.

Valve member 40 includes an annular groove 46 engaging thereto the control rod 53 which may be manually operated by an operator to axially move valve member 40 along shaft 1 as desired, for example to return valve member 40, having been moved into a dynamically connected state by balls 50, back to its dynamically disconnected original state, thus allowing the operator to shift gears.

Figure 8:
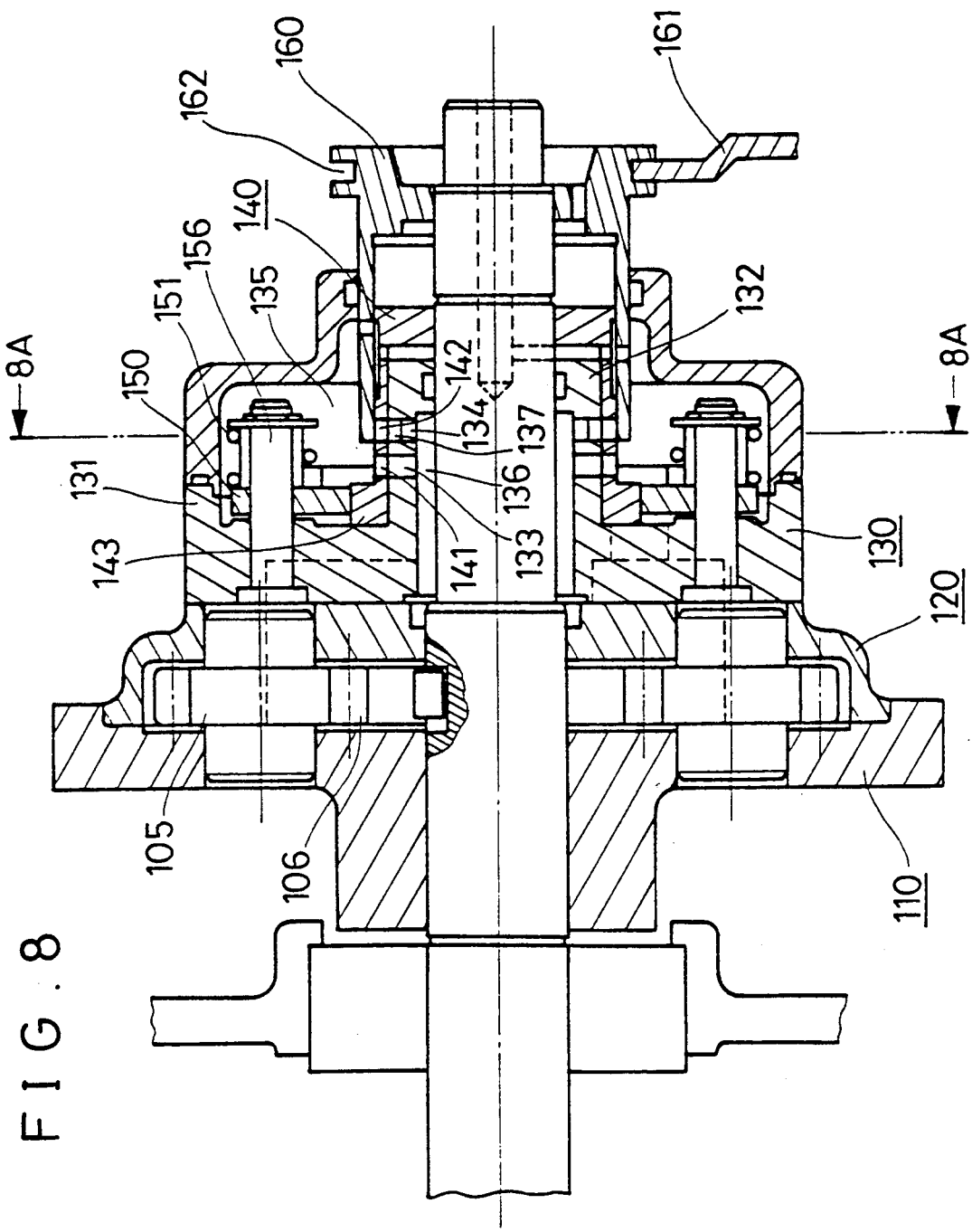
FIG. 8 is a sectional view showing a second preferred embodiment of a hydraulic clutch according to the present invention.
Figure 9:
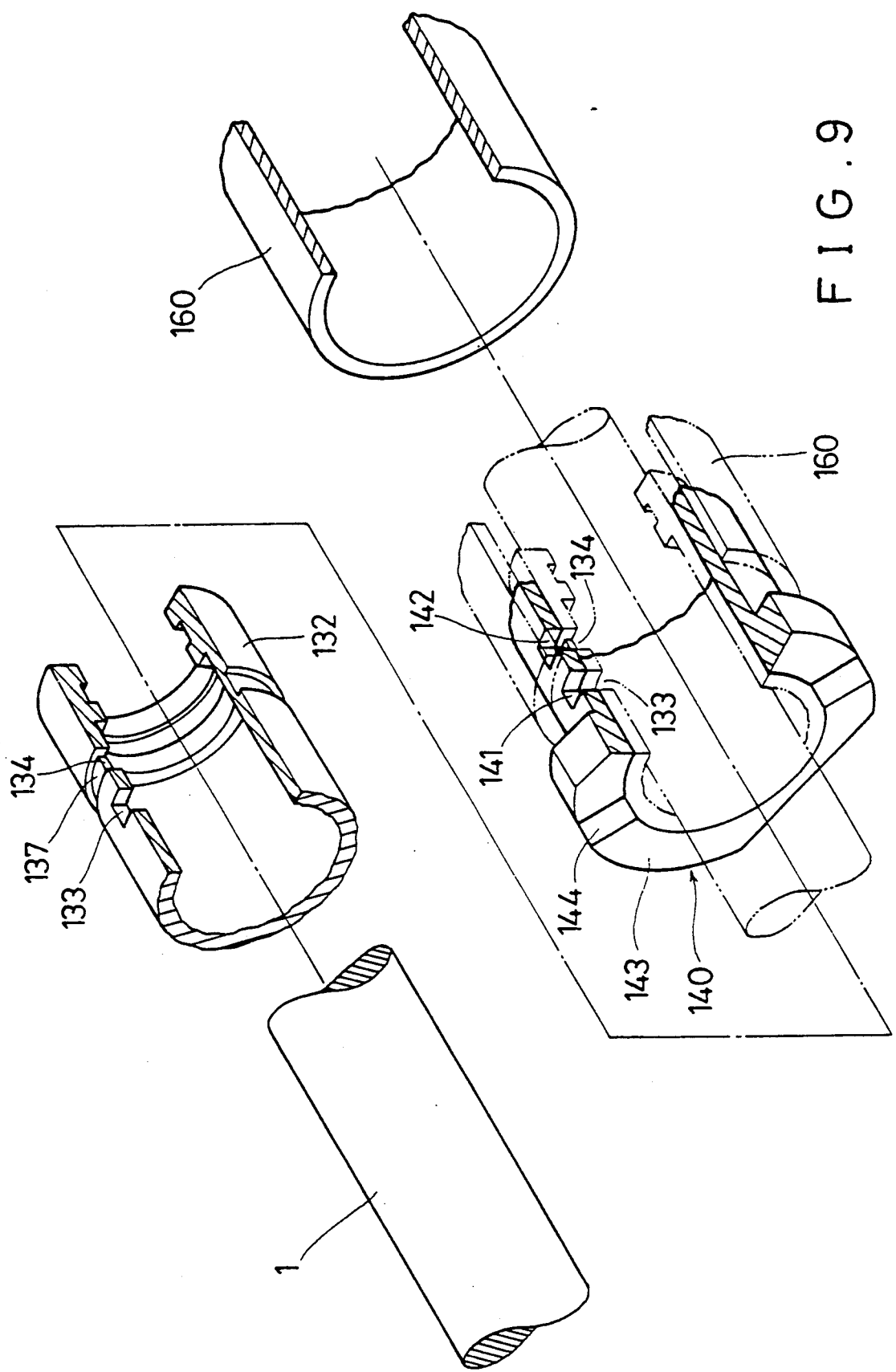
FIG. 9 is fragmentarily exploded perspective view showing part of a valve member included in the hydraulic clutch illustrated in FIG. 8.

Referring now to FIGS. 8-9, a second preferred embodiment of a hydraulic clutch according to the present invention is similar to the first preferred embodiment by also including a hub 110, a pump body 120, a pump casing 130, a valve member 140, a pair of driving pumping gears 105 and a passive pumping gear 106. However, the structures of casing 130 and valve member 140 are different from those of pump casing 30 and valve member 40 described above. Pump casing 130 includes an outer annulus 131, a hollow central portion 132 rotatably sleeving thereon valve member 140, and an annular space 135 formed between annulus 131 and central portion 132. Valve member 140 has an end flange 143 provided with two diametrically oppositely disposed indentations 144. A sleeve 160 is slidably sleeved on valve member 140.

The passage means of the second preferred embodiment includes a first through hole 141 and a second through hole 142 axially spaced from each other on valve member 140, a third through hole 133 and a fourth through hole 134, axially spaced from each other on central portion 132 and respectively corresponding to first through hole 141 and second through hole 142, a cylindrical oil passage 136 formed between central portion 132 and shaft 1, and an annular groove 137 provided around the periphery of central portion 132 for always communicating fourth through hole 134 with second through hole 142 no matter how valve member 140 is rotated with respect to central portion 132. The second through hole 142 can be closed by sleeve 160 in a manner to be described latter.

The control mechanism of the second preferred embodiment comprises an automatic control device including a pair of weights 150 and a pair of torsional springs 151, and a manual control device including a control rod 161 having an end engaged in an annular groove 162 of sleeve 160 so that an operator can operate control rod 161 to axially slide sleeve 160 on valve member 140 for opening or closing second through hole 142. Each weight 150 includes a centrifugally moving portion 152, an engaging pawl 153 engaged in one of the two indentations 144, a retaining hole 154, and a pivoting hole 155 through which a pin 156, secured at one end to casing 130, passes for pivotally mounting weight 150 thereon. Spring 151 is pivotally mounted around pin 156, and has one end retained in hole 154 and the other end urged against outer annulus 131 so that when portion 152 is centrifugally moved outward to the position shown by dotted line in FIG. 8A against the biasing effect of torsional spring 151, engaging pawl 153 will rotate valve member 140 with respect to casing 130 as will be described in further detail hereinafter.

Figures 8A, 8B:
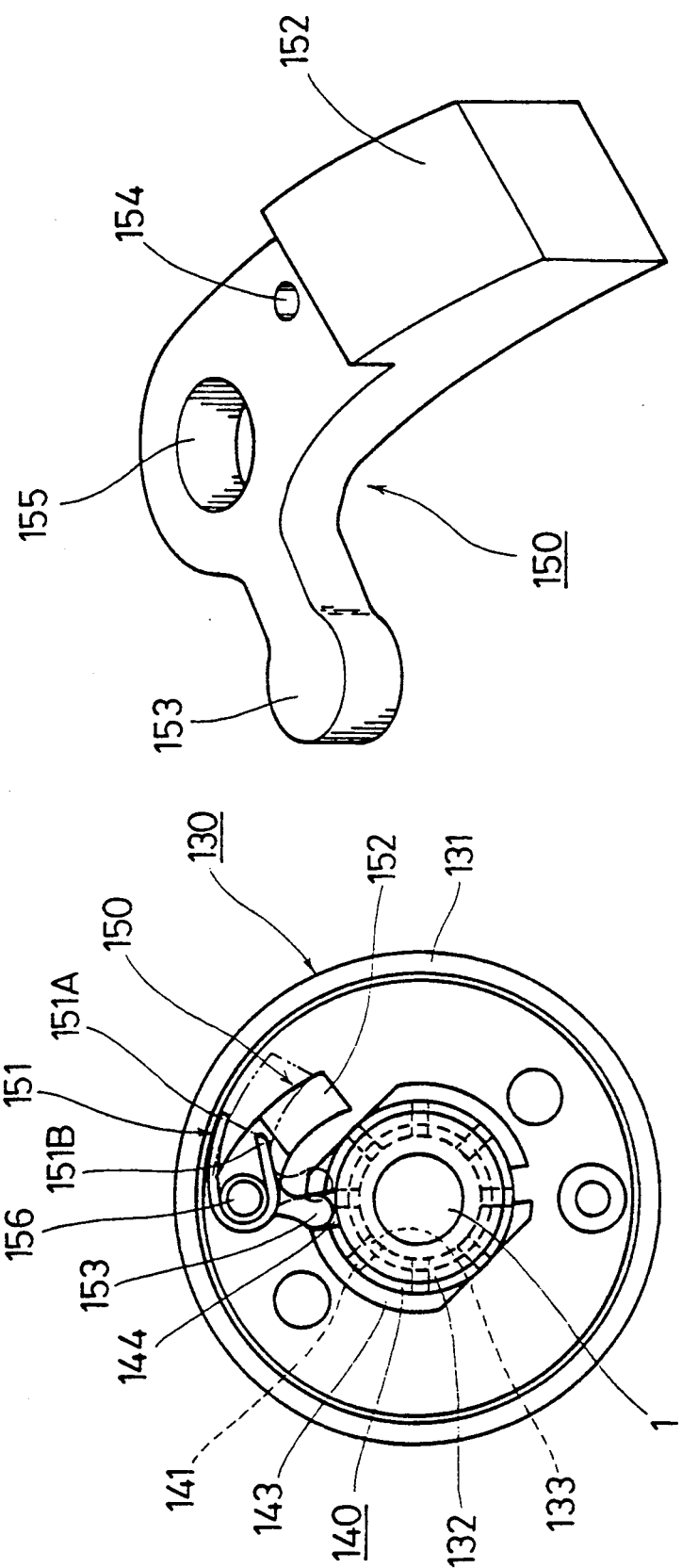
FIG. 8A is a sectional view taken along line 8A—8A in FIG. 8.
FIG. 8B is a perspective view showing a centrifugal weight of a hydraulic clutch in FIG. 8A.

When hub 110 or pump casing 130 rotates at relatively low speed so that portion 152 only suffers a relatively small centrifugal force incapable of counteracting the biasing force provided by spring 151, weight 150 remains at a position shown by solid line in FIG. 8A, and first through hole 141 is kept aligned with third hole 133 (see FIGS. 8 and 9) so that the oil passage is not interrupted and thus an increasing hydraulic pressure cannot be established in the pump mechanism of the present hydraulic clutch so that output shaft 1 and hub 110, which is connected to the power source, are in a dynamically disconnected state.

When hub 110 or pump casing 130 rotates at a sufficiently high speed so that portion 152 of weight 150 carried thereby is subject to a centrifugal force large enough for overcoming the biasing force acting on weight 150 by spring 151, and weight 150 is forced to move to the dotted-line position (see also FIG. 8A) so as to drive valve member 140 to rotate relative to central portion 132 by means of ite pawl 153, thus moving valve member 140 into a position in which first through hole 141 is no more in alignment with third through hole 133. Under such situation, since second through hole 142 is closed by sleeve 160 also, oil passage 136 cannot communicate with annular space 135 so that an increasing hydraulic oil prissure can be established gradually in the pump mechanism, thus dynamically connecting output shaft 1 and hub 110 which is coupled to the power source. If the operator now operates control rod 161 to axially slide sleeve 160 on valve member 140 to release second through hole 142 from being closed by sleeve 160, the interrupted hydraulic oil line will thus be reopened so that hub 10 and shaft 1 can enter a dynamically disconnected state, thus permitting the operator to shift gears.

The above described embodiments are illustrative but not limitative and can easily be modified by those skilled in the art, e.g. incorporating an electromagnetic control into the control mechanism, without departing from the spirit and scope of the present invention which is defined in the appended claims.

What I claim is:

1. A hydraulic clutch adapted to be mounted between a power source and an output shaft, comprising:

a pump mechanism including a hollow housing assembly coupled to the power source and rotatably mounted on the output shaft and having hydraulic passages provided therein, a passive gear fixed to the output shaft, and at least one driving gear rotatably supported within said housing assembly and engaging for driving said passive gear;

a valve member sleeved on the output shaft for movement relative to said output shaft;

a passage means provided by said output shaft, said pump mechanism and said valve member, and adapted to be flooded with a liquid coming from a liquid source; and a control mechanism adapted to selectively place said hydraulic clutch either into a dynamically connected state wherein the output shaft is dynamically connected to the power source by shifting the position of the valve member on said output shaft, interrupting said passage means to establish a sufficiently high hydraulic pressure within said housing assembly and around said driving and passive gears, or into a dynamically disconnected state wherein the output shaft is disconnected from the power source by opening said passage means to release the established hydraulic pressure within said housing assembly, wherein said housing assembly includes:

a hub rotatably mounted on the output shaft and coupled to the power source;

a pump body coaxially fixed to said hub, said pump body rotatably mounting said driving gear;

a pump case coaxially fixed to said pump body for receiving therein said valve member, said control mechanism including an automatic control device and a manual control device, said automatic control device including a centrifugal member held between said pump mechanism and said valve member and adapted to move said valve member when sufficient centrifugal force is exerted on said centrifugal member, and a biasing means for urging one of said centrifugal member and said valve member against the other one of said centrifugal member and said valve member, and wherein said centrifugal member includes at least one weight pivotally supported by said housing assembly and having a centrifugally moving portion and an engaging pawl;

said biasing member is a torsional spring mounted between said weight and said housing assembly;

said housing assembly includes a central portion rotatably sleeved on said output shaft and rotatably sleeving thereon, said valve member;

said engaging pawl engaging said valve member for rotating said valve member to close off said passage means when said housing assembly rotates at a sufficiently high speed capable of overcoming the biasing force exerted on the weight by said biasing means;

said passage means includes at least a first and a second radial through hole spaced from each other on said valve member, at least a third and a fourth radial through hole spaced from each other on said central portion and respectively capable of being radially aligned with said first and second through holes, and an annular groove peripherally provided on said central portion for always communicating said second through hole with said fourth through hole; and said hydraulic clutch further includes a sleeve axially slidable on said valve member for closing off said second radial through hole so that when said second radial hole is closed by said sleeve and said housing assembly rotates at a sufficiently high speed for enabling said weight to actuate said valve member so as to rotate the valve member and thus interrupt the radial alignment between the first through hole and the third through hole, a hydraulic pressure is established in said housing assembly, for dynamically connecting said housing assembly and said output shaft.

2. A hydraulic clutch according to claim 1 wherein said manual control device includes a control rod which can be operated directly by an operator to move said sleeve to a first position closing said second through hole or a second position opening said second through hole.

3. A hydraulic clutch adapted to be mounted between a power source and an output shaft, comprising:

a pump mechanism driven by the output shaft, said pump mechanism having a first passage for hydraulic oil;

a valve mechanism, comprising a rotatable valve body surrounding said pump mechanism, said valve body being provided with a passage for hydraulic oil and being rotatable between first and second positions for connecting and disconnecting said first and second passages; and a sleeve member surrounding said valve body, said sleeve member being provided with a third passage for hydraulic oil and being axially slidable for releasing the oil pressure in said first and second passages, said first, second and third passages forming a loop; and a control mechanism for selectively placing said hydraulic clutch in a first dynamically connected state wherein the output shaft is dynamically connected to the power source by rotating said valve body to establish a sufficiently high oil pressure within said first and second passages, or to become a dynamically disconnected state wherein the output shaft is disconnected from the power source by rotating said valve body to release the established oil pressure within said housing assembly.

4. A hydraulic clutch as claimed in claim 3, wherein:

said valve body has a first through hole and a second through hole, said valve body is rotatable through an angle in proportion to the rotating speed of the pump mechanism for connecting and disconnecting said loop, and said sleeve member has a third through hole, said passages form a loop, and said sleeve member is axially slidable for opening said second passage so as to release the oil pressure in all of said passages.

* * * * *